March 18, 1941.  E. A. GLYNN  2,235,292
MATRIX AND PRESSURE PLATE ATTACHMENT FOR TIRE MOLDS
Filed March 16, 1938

INVENTOR
E. A. Glynn
BY
ATTORNEY

Patented Mar. 18, 1941

2,235,292

UNITED STATES PATENT OFFICE 2,235,292

MATRIX AND PRESSURE PLATE ATTACHMENT FOR TIRE MOLDS

Edwin A. Glynn, Lodi, Calif., assignor to Super Mold Corporation of California, Lodi, Calif., a corporation of California Application March 16, 1938, Serial No. 196,203

8 Claims. (Cl. 18—18)

This invention relates to the tire industry, and particularly to a recapping and retreading mold.

The principal object of my invention is to provide a matrix and pressure plate structure for a mold so constructed and arranged that the mold may be successfully and efficiently used either for tire recapping or full retreading operations without necessitating any replacement of the main or permanent pressure plates or the main tread engaging matrices when adapting the mold for one operation or the other.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
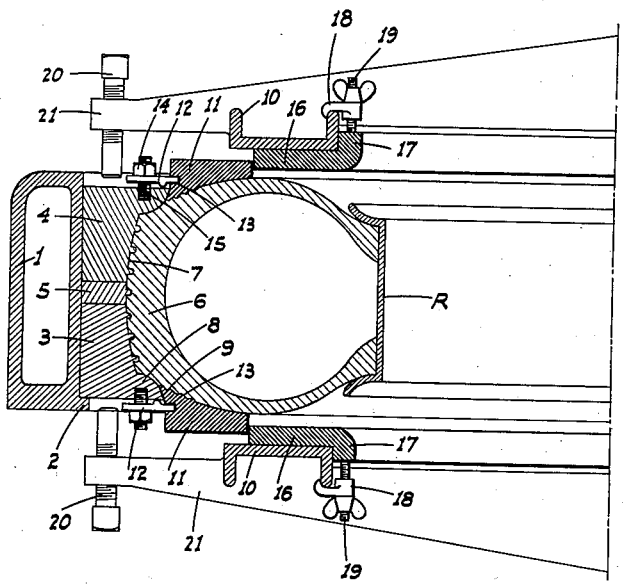
Figure 1 is a fragmentary sectional elevation of a mold as equipped for a full retreading operation, before the pressure plates are advanced.
Figure 2:
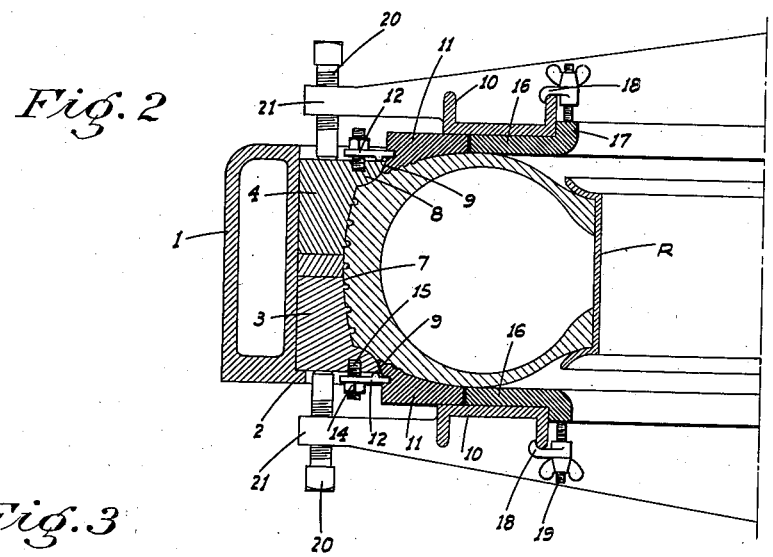
Figure 2 is a similar view showing the pressure plates advanced.
Figure 3:
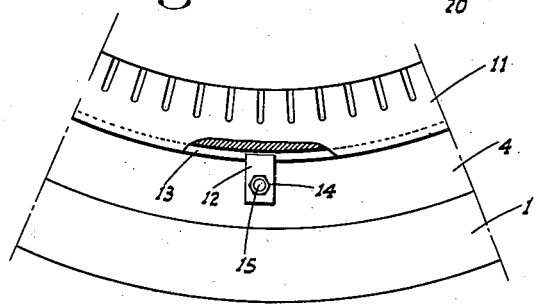
Figure 3 is a fragmentary plan view of the mold showing the extension matrix in place.

Referring now more particularly to the characters of reference on the drawing, the mold depicted is essentially the same as shown in my copending application Serial No. 117,304, filed December 23, 1936, and which was initially designed for recapping purposes. Said mold comprises a cylindrical ring-like body 1 provided with a steam chamber, and formed with an inturned flange 2 at the bottom. This flange forms the support for the lower matrix section 3, which cooperates with the upper matrix section, said sections being as is customary, used with or without a spacer or filler ring 5.

The matrix sections are bored to conform to the tread portion of the tire 6 as at 7, and at the sides of said portion are formed with skirts 8 projecting radially inward and of generally convex form, terminating however in non-curved surfaces 9 disposed at an acute angle to the axis of the mold, the included angles of the two skirts facing each other. Laterally movable ring-like pressure plates 10, connected for lateral movement toward or away from each other as a unit, are mounted on the mold structure to engage the side walls of a tire being recapped.

The above features are shown and described in said copending application and are all that is necessary for recapping.

In order to carry out a full retread job when desired, without necessarily changing the matrix sections or taking the heavy pressure plate structure out of the mold, I provide the following attachments:

Projecting radially inward from the matrix skirts are matrix extensions 11, of sufficient radial extent to cover all the new side wall rubber of the tire. These extensions overlap and closely engage the relatively angular surfaces 9 of the skirts, so that said extensions cannot be moved laterally outward. Also, the extensions thus combine with the matrix sections to provide a continuous enclosure for the retread rubber. The contacting surfaces of the skirts and matrix extensions are held in wedging engagement, and the upper extension held from dropping into the tire space of the mold by means of relatively small plates 12. These extend radially of the mold and are disposed at spaced points thereabout, and are removably and rockably supported intermediate their ends on the outer surface of the matrix skirts. The inner ends of the plates engage in circumferential grooves 13 cut in the outer periphery of the extensions 11, and such ends tend to be forced laterally out by the nuts 14 mounted on the studs 15 which are secured in the matrix sections and project through the plates radially out from their point of rocking.

Inasmuch as the pressure plates 10 of course overlap the matrix extensions, they cannot then be adjusted to engage the sides of the tire being retreaded, between the tire rim R and the inner edge of the matrix extensions. I therefore provide additional pressure plate rings 16 of an outer diameter such that they will fit closely within the extensions 11. These rings engage the pressure plates 10 and are provided about their inner periphery with flanges 17 which overhang the inner peripheral edges of the plates 10 and hold the rings 16 against horizontal displacement.

The rings 16 are removably mounted on the pressure plates by hook elements 18 which overhang the plates at their inner periphery and which are releasably mounted on studs 19 projecting from the flanges 17.

The depth of rings 16 is such that when the plates 10 are moved toward each other so that the portions thereof exposed outwardly of the rings engage the extensions 11, the adjacent faces of the rings will then project as continuations of the corresponding or tire engaging faces of the matrix extensions.

This engagement of the pressure plates with the matrix extensions 11 support and brace the latter against possible outward deflection; further inward movement of the pressure plates being prevented by adjustable screws 20 mounted in spider arms 21 integral with the pressure plates, and which screws then engage the matrices 3 and 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tire mold structure comprising a body, a matrix unit mounted in the body to enclose only the tread portion of a tire in the mold, pressure plates arranged for lateral movement toward the side walls of the tire and relative to the matrix unit, matrix extensions separate from the matrix unit adapted to be removably mounted in position to extend as side continuations thereof to engage the side walls of the tire, said extensions projecting radially inward of the plane of the outer periphery of the pressure plates, and pressure plate elements adapted to be mounted on the portions of the pressure plates radially inward of the matrix extensions to engage the tire between said extensions and the rim bead portions of said tire.

2. A tire mold structure comprising a body, a matrix unit mounted in the body to enclose only the tread portion of a tire in the mold, pressure plates arranged for lateral movement toward the side walls of the tire, matrix extensions separate from the matrix unit adapted to be mounted in position to extend as side continuations thereof to engage the side walls of the tire, rings adapted to be mounted on the pressure plates radially inward of the matrix extensions to build up said plates laterally so as to provide for engagement with the tire radially inward of said extensions when the latter are in place, said plates being of ring-like form, and flanges on the rings about the inner periphery thereof overhanging and engaging the inner peripheral edges of the pressure plates to locate the rings against radial displacement.

3. A tire mold structure comprising a body, a matrix unit mounted in the body to enclose only the tread portion of a tire in the mold, matrix extensions separate from the matrix unit adapted to extend as side continuations thereof to engage the side walls of the tire, the extensions and unit along adjacent edges overlapping each other and being angularly cut in a direction to prevent lateral outward movement of the extensions, and means removably securing the extensions against inward lateral movement.

4. A tire mold structure comprising a body, a matrix unit mounted in the body to enclose only the tread portion of a tire in the mold, matrix extensions separate from the matrix unit adapted to extend as side continuations thereof to engage the side walls of the tire, the extensions and unit along adjacent edges overlapping each other and being angularly cut in a direction to prevent lateral outward movement of the extensions, and means between the matrix unit and extensions removably securing the extensions against inward lateral movement and maintaining the angular edges in wedging engagement.

5. A structure as in claim 4, in which the outer peripheral edges of the extensions project laterally out from the sides of the matrix unit, and said securing means, for each extension, comprises plates extending radially of and rockably resting intermediate their ends on the corresponding side surface of the matrix unit, the said peripheral edge of the extension having a circumferential groove into which the radially inner ends of the plates project, and means engaging the plates to removably secure them on the matrix unit and also acting to rock said plates in a direction tending to draw the extension laterally out.

6. A structure as in claim 1, in which the portions of the pressure plates exposed radially out from the plate elements are adapted to engage the adjacent portions of the matrix extensions when the pressure plate elements are moved into engagement with the tire.

7. A tire mold structure comprising a body, a matrix unit mounted in the body to enclose the entire tread portion only of a tire in the mold, matrix extensions separate from the matrix unit adapted to extend as side continuations thereof to engage the side walls of the tire, pressure plates arranged for lateral movement toward the side walls of the tire and pressure plate elements adapted to be mounted on the pressure plates to engage the side walls of the tire radially inward of the matrix extensions.

8. A structure as in claim 7, with means between the pressure plates and matrix unit preventing lateral inward movement of the pressure plates beyond a position in which the tire-wall engaging faces of the extensions and pressure plate elements will substantially aline with each other.

EDWIN A. GLYNN.